C. A. WILLIAMS.
LEATHER WORKING MACHINE.
APPLICATION FILED SEPT. 24, 1918.

1,382,584.

Patented June 21, 1921.
2 SHEETS—SHEET 1.

Inventor

Charles Arthur Williams
per Arthur J. Stephens
Attorney.

C. A. WILLIAMS.
LEATHER WORKING MACHINE.
APPLICATION FILED SEPT. 24, 1918.

1,382,584.

Patented June 21, 1921.
2 SHEETS—SHEET 2.

Inventor

Charles Arthur Williams
per Arthur J. Stephens
Attorney

UNITED STATES PATENT OFFICE.

CHARLES ARTHUR WILLIAMS, OF TORQUAY, ENGLAND, ASSIGNOR TO CLARK SON & MORLAND, LTD., OF GLASTONBURY, ENGLAND.

LEATHER-WORKING MACHINE.

1,382,584.  Specification of Letters Patent.  Patented June 21, 1921.

Application filed September 24, 1918. Serial No. 255,493.

*To all whom it may concern:*

Be it known that I, CHARLES ARTHUR WILLIAMS, a subject of the King of Great Britain and Ireland, residing at 40 Belmont road, Torquay, in the county of Devon, England, have invented certain new and useful Improvements in Leather - Working Machines, of which the following is a specification.

My invention relates to improvements in or relating to staking machines of the Slocomb and like types for working leather.

The present invention is designed to provide means whereby skins of all descriptions, heavy or light leathers, can be staked and rolled out in the one operation with practically no loss of measurement through tearing or breaking and with results which are much more satisfactory than those now obtained from the machines at present in use, and brought about with simpler adjustments of the mechanism and less labor for the operator.

The present invention comprises a staking machine of the Slocomb type in which the cutting tool is mounted on the upper arm with a small roll behind said tool and in which said tool and roll co-act with a large felt or rubber roll mounted on the lower arm with a dull blade or small roll in front of said roll.

My invention is illustrated by way of example in the accompanying drawings, in which—

Figure 1:
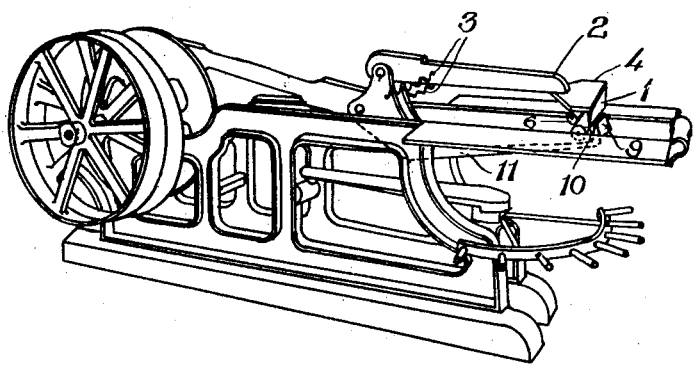
Figure 1 shows a perspective view of a staking machine.
Figure 2:
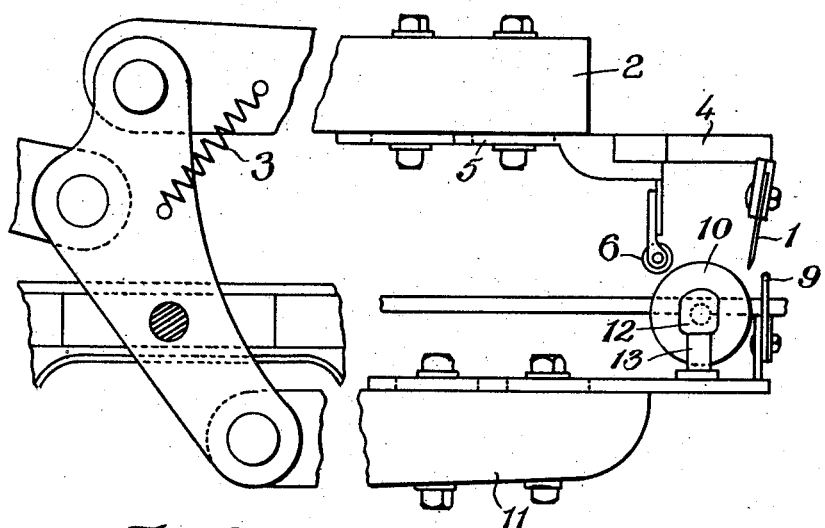
Fig. 2 shows a side view of that portion of the staking machine which forms the invention.
Figure 3:
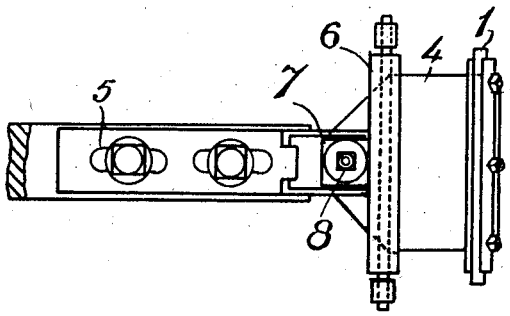
Fig. 3 shows a detail plan view of the cutting tool support.

Referring now to the drawings the cutting tool 1 which may be of steel or carborundum, is fixed in the upper arm 2 enabling the skin to be staked flesh side uppermost and thus allowing of the operator following the action of the tool on the skin and avoiding flaws or weak places. Springs 3 are arranged on the rear end of the said upper arm 2.

The employment of the cutting tool 1 on the upper arm permits of the free play of these springs 3 and consequently more resiliency with less liability to tear or break the skin. The front knife 1 is carried on the support 4, which support is adjustably mounted on the upper arm 2 at 5. The said knife or tool 1 is inclined so that its cutting edge faces the work at an angle corresponding to that employed in hand practice. A small roll 6 conveniently one inch in diameter is mounted on said upper arm 2 at a suitable distance behind the cutting tool 1. This small roll may be of steel, felt or rubber or a rubber composition, and is adapted when the jaws of the machine are closed to fit closely behind the felt roll, which is mounted on the lower arm as hereinafter described. Roll 6 is preferably mounted on slotted brackets 7 on the tool support 4 and is adapted to be moved to the correct adjustment in relation to the felt roll 10 and there locked in position by the nut 8. This roll 6 performs the rolling out of the skin before the latter comes under the cutting tool 1, and also in conjunction with the said felt roll 10 is adapted to hold the skin in an elastic grip, enabling the tool 1 to work with greater effect without causing the skin to tear or break at the edges.

The lower arm 11 carries a dull blade 9 or alternatively a small roll similar to the roll 6 and behind said dull blade the above-mentioned felt or rubber roll 10 is mounted on the lower arm. The felt roll 10 on the lower arm 11 is mounted in bearings 12 carried upon pillars 13, which bearings are adjustable on said arm in order to compensate for the wear on the felt roll. Instead of the arrangement of the cutting tool and small roll on the upper arm and the felt roll on the lower arm, it may sometimes be desirable to reverse the arrangement and arrange the cutting tool and small roll on the lower arm and the felt roll on the upper arm.

What I claim is:—

1. A staking machine of the Slocomb type comprising an upper arm, a lower arm, a table, means for reciprocating said arms over said table, a cutting tool mounted on said upper arm, a rolling out member mounted behind said tool adapted to roll out the inequalities in the skin being operated upon before the latter comes under the cutting tool, a large roll mounted on said lower arm adapted to coöperate with said rolling out member to hold the skin in an elastic grip and to co-act with said cutting tool, and secondary means on said lower arm for rolling out the skin in front of said large roll.

2. A staking machine of the Slocomb type comprising an upper arm, a lower arm, a link connecting the inner ends of said arms, springs connecting said upper arm with said link, a table, means for reciprocating said arms over said table, a cutting tool mounted on said upper arm, a rolling out member mounted behind said tool adapted to roll out the inequalities in the skin being operated upon before the latter comes under the cutting tool, a large roll mounted on said lower arm adapted to coöperate with said rolling out member to hold the skin in an elastic grip and to co-act with said cutting tool, and secondary means on said lower arm for rolling out the skin in front of said large roll.

3. A staking machine of the Slocomb type comprising an upper arm, a lower arm, a table, means for reciprocating said arms, over said table, a cutting tool mounted on said upper arm and inclined so that its cutting edge faces the work at an angle corresponding with that employed in hand practice, a rolling out member mounted behind said tool adapted to roll out the inequalities in the skin being operated upon before the latter comes under the cutting tool, a large roll mounted on said lower arm adapted to coöperate with said rolling out member to hold the skin in an elastic grip and to co-act with said cutting tool, and secondary means on the lower arm for rolling out the skin in front of said large roll.

4. A staking machine of the Slocomb type, comprising an upper arm, a lower arm, a table, means for reciprocating said arms over said table, an adjustable tool holder at the extremity of the upper arm, a cutting tool mounted in said holder, a rolling out member mounted behind said tool adapted to roll out the inequalities in the skin being operated upon before the latter comes under the cutting tool, a large roll mounted on said lower arm adapted to coöperate with said rolling out member to hold the skin in an elastic grip and to co-act with said cutting tool, secondary means on said lower arm for rolling out the skin in front of said large roll and adjustable supports in said arms for said gripping and rolling out members.

5. A staking machine of the Slocomb type, comprising an upper arm, a lower arm, a link connecting the inner ends of said arms, springs connecting said upper arm with said link, a table means for reciprocating said arms over said table, an adjustable tool holder at the extremity of the upper arm, a cutting tool mounted in said holder, inclined so that its cutting edge faces the work at an angle corresponding with that employed in hand practice, a small roll mounted behind said tool adapted to roll out the inequalities in the skin being operated upon before the latter comes under the cutting tool, a large roll mounted on said lower arm adapted to coöperate with said rolling out member to hold the skin in an elastic grip and to co-act with said cutting tool, a blunt tool on said lower arm for rolling out the skin in front of said large roll and adjustable supports on said arms for said gripping and rolling out members.

In testimony whereof I have signed my name to this specification.

CHARLES ARTHUR WILLIAMS.